(12) United States Patent  
Pandey

(10) Patent No.: US 9,161,334 B2
(45) Date of Patent: *Oct. 13, 2015

(54) INDICATING RADIO BEARER INFORMATION TO NETWORK APPLICATIONS

(71) Applicant: AT&T Mobility II LLC, Atlanta, GA (US)

(72) Inventor: Vinod Pandey, Phoenix, AZ (US)

(73) Assignee: AT&T Mobility II LLC, Atlanta, GA (US)

(*) Notice: Subject to any disclaimer, the term of this patent is extended or adjusted under 35 U.S.C. 154(b) by 214 days.

This patent is subject to a terminal disclaimer.

(21) Appl. No.: 13/684,898

(22) Filed: Nov. 26, 2012

(65) Prior Publication Data

US 2013/0083761 A1 Apr. 4, 2013

Related U.S. Application Data

(63) Continuation of application No. 11/738,145, filed on Apr. 20, 2007, now Pat. No. 8,340,678.

(60) Provisional application No. 60/894,009, filed on Mar. 9, 2007.

(51) Int. Cl.
*H04W 72/04* (2009.01)
*H04W 28/20* (2009.01)
*H04W 28/02* (2009.01)
*H04L 12/825* (2013.01)
*H04W 76/02* (2009.01)

(52) U.S. Cl.
CPC .............. *H04W 72/04* (2013.01); *H04L 47/26* (2013.01); *H04W 28/0231* (2013.01); *H04W 28/20* (2013.01); *H04W 76/022* (2013.01)

(58) Field of Classification Search
CPC .......... H04L 29/06523; H04L 67/322; H04W 56/001; H04W 36/30; H04W 48/18; H04W 56/00; H04W 72/1231; H04W 36/0011
See application file for complete search history.

(56) References Cited

U.S. PATENT DOCUMENTS

| | | | |
|---|---|---|---|
| 6,661,797 B1 | 12/2003 | Goel et al. | |
| 7,072,961 B1 | 7/2006 | Maclean et al. | |
| 7,738,871 B2 * | 6/2010 | Olvera-Hernandez et al. | 455/436 |
| 8,233,450 B2 * | 7/2012 | Zaki et al. | 370/331 |
| 2002/0072382 A1 * | 6/2002 | Fong et al. | 455/507 |
| 2002/0181395 A1 | 12/2002 | Foster et al. | |
| 2004/0102194 A1 * | 5/2004 | Naghian et al. | 455/436 |

(Continued)

OTHER PUBLICATIONS

OA dated Dec. 7, 2010 for U.S. Appl. No. 11/738,145, 22 pages.

(Continued)

*Primary Examiner* — Liton Miah

(74) *Attorney, Agent, or Firm* — Amin, Turocy & Watson, LLP

(57) ABSTRACT

Providing information related to a quality of a mobile communication link to an internal and/or external application provider is described herein. By way of example, a system can include component(s) that can receive communication link quality information associated with a mobile session, incorporate such information into a data packet, and forward such data packet to an application provider. The system can provide such information for second generation network components, third generation network components, and advanced components compatible with both second and third generation network architectures.

20 Claims, 12 Drawing Sheets

(56) References Cited

U.S. PATENT DOCUMENTS

| | | |
|---|---|---|
| 2004/0203640 A1 | 10/2004 | Molander et al. |
| 2005/0071494 A1 | 3/2005 | Rundquist et al. |
| 2005/0101245 A1* | 5/2005 | Ahmavaara ................. 455/1 |
| 2005/0128956 A1 | 6/2005 | Hsu et al. |
| 2008/0132269 A1* | 6/2008 | Shen et al. ............ 455/550.1 |
| 2008/0159232 A1 | 7/2008 | Thalanany et al. |

OTHER PUBLICATIONS

Notice of Allowance mailed Aug. 27, 2012 for U.S. Appl. No. 11/738,145, 20 pages.

* cited by examiner

INDICATING RADIO BEARER INFORMATION TO NETWORK APPLICATIONS

RELATED APPLICATION

This patent application claims priority to U.S. patent application. Ser. No. 11/738,145, filed Apr. 20, 2007, and entitled, "INDICATING RADIO BEARER INFORMATION TO NETWORK APPLICATIONS," which is a non-provisional application claiming priority to U.S. Provisional Application No. 60/894,009 filed Mar. 9, 2007, entitled INDICATING RADIO BEARER INFORMATION TO NETWORK APPLICATIONS, the entireties of which applications are incorporated herein by reference.

BACKGROUND

Third generation partnership project (3GPP) mobile communication standards are being implemented worldwide to effectuate a global transition from a mobile voice communication architecture to a voice and data communication architecture. Such standards can typically specify, for example, data transfer protocols, wireless radio frequency ranges, roaming standards and protocols, mechanisms for transferring billing-related information, etc. Many concurrent standards are required to effectuate communication amongst the various existing communication architectures (e.g., second generation (2G), data-capable second generation (2.5G), third generation (3G), etc.), and until transition to a single mobile architecture is fully established, the disparate standards and multi-mode mobile devices incorporating such standards must be maintained. Consequently, network protocols bridging communications between such devices and various compatible network architectures must also be maintained. For example, a multi-mode device that can transition between a 2G, 2.5G, and 3G network requires communication protocols that facilitate transfer amongst those networks. In addition, because transfer could be necessary during a communication session, such protocols should facilitate network transfer both in and out of a session.

A typical problem that arises as a result of network transfer relates to managing data exchange compatible with one network architecture as compared with a second architecture. For instance, a first network architecture can specify a particular quality of service applicable to communication with devices, whereas a second network architecture might be a 'best effort' network, which cannot provide quality of service guarantees. Yet to maintain reliable communication, a network service provider must find a mechanism to bridge a gap between established networks that can provide quality of service guarantees and newer networks, highly desired due to advanced technological capabilities, which are still developing an infrastructure necessary for such guarantees.

Differing communication protocols can affect application content providers that incorporate network applications related to network media transfer. Examples of such network applications include streaming video applications, streaming audio applications, Internet access and interface applications, ring-tone applications facilitating downloading of ring-tones to mobile devices, and like applications. Network applications, whether supplied by a communication network provider or a third-party entity, must also transition amongst varying data exchange parameters (e.g., packet transmission bit-rate, bandwidth, priority, error-rate, etc.) required by differing networks as devices roam from one network architecture to another. Doing so smoothly and efficiently can help facilitate desired quality of service guarantees for technologically advanced networks, analogous to guarantees provided by established, conventional networks.

Figure 1:
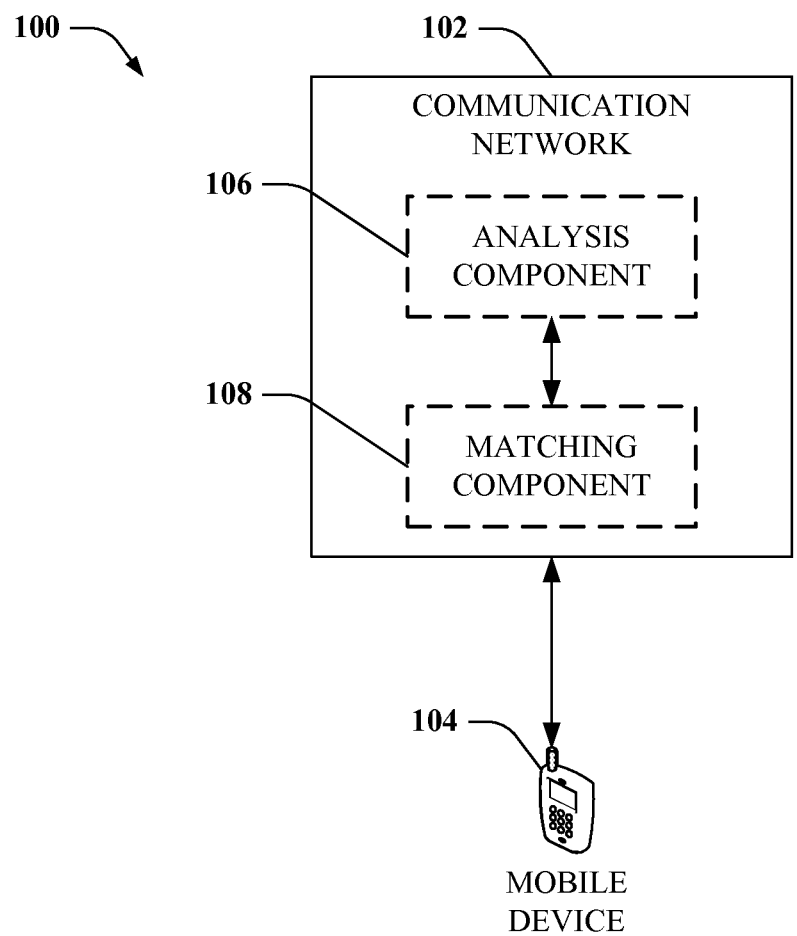
FIG. 1 depicts an example high-level block diagram of a system that can identify and provide a mobile communication link quality in accord with various aspects of the claimed subject matter.

Appendix A discloses various aspects of the claimed subject matter and is hereby incorporated into the subject specification.

DETAILED DESCRIPTION

The subject matter is now described with reference to the drawings. In the following description, for purposes of explanation, numerous specific details are set forth in order to provide a thorough understanding of the claimed subject matter. It can be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, and the like), optical disks (e.g., compact disk (CD), digital versatile disk (DVD), etc.), smart cards, and flash memory devices (e.g., card, stick, key drive, and the like). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Communication link properties are provided, associated with a communication between a mobile device and a communication network, to an application content/service provider. Such properties can be used to facilitate an application data exchange appropriate for a mobile connection quality. For example, if an application provider is notified that a particular network link allows for a certain data transmission bandwidth, the provider can ensure that a streaming video application transfers data to the device at a rate substantially similar to that bandwidth. Additionally, information relating to a network architecture type (e.g., a data-capable, relatively moderate bandwidth, second generation (2.5G) and/or relatively high bandwidth third generation (3G) network) associated with a mobile link can be forwarded to a network gateway, embedded within a portion of a communication data packet, and forwarded to an application content/service provider. Forwarding network architecture information to an application content/service provider can be sufficient to indicate communication link properties associated with a mobile communication. Consequently, such provider can operate an application in a manner appropriate for data exchange via conventional networks, or take advantage of high quality service provided by advanced networks.

Detecting a change in communication link quality and broadcasting such change to application content/service providers is also provided. Such aspects enable an application content/service provider to contemporaneously adjust application data exchange between a mobile device and a communication network according to a concurrent communication link quality. More specifically, a detection component can determine a change in communication link quality (e.g., caused by handover from a third generation (3G) communication network to a data-capable second generation (2.5G) communication network, or vice versa) and forward the determination to a gateway component. The gateway component can provide this determination to an application content/service provider (e.g., a third-party streaming video application provider) by modifying a data packet so as to indicate such change in communication link quality, and forwarding the data packet to the application content/service provider. Accordingly, an application content/service provider is not required to monitor a network or a mobile device in order to provide an application data exchange appropriate for a concurrent communication link quality.

Systems and methods are also provided that can store communication link information associated with multiple communications links between one or more networks and one or more mobile devices. Components associated with the systems and methods can detect communication link quality information and/or change in quality information (e.g., caused by roaming from an advanced to a conventional network architecture, caused by increase in neighboring traffic or network interference, etc.) and update a storage component with the quality information. An application content/service provider can access such stored quality information to determine an appropriate parameter (e.g., bandwidth) applicable to a data exchange related to an application. Consequently, applications that do not interpret data packets modified to include such information can still provide an application data exchange appropriate for a particular communication link quality.

To the accomplishment of the foregoing and related ends, certain illustrative aspects are described herein in connection with the description herein and the annexed drawings. These aspects are indicative, however, of but a few of the various ways in which the principles disclosed herein can be employed and is intended to include all such aspects and their equivalents. Other aspects and novel features will become apparent from the following detailed description when considered in conjunction with the drawings.

FIG. 1 depicts an example block diagram of a system 100 that can receive information associated with a quality of a communication link and can provide that information to network applications. A communication network 102 and a mobile device 104 can maintain a wireless communication link to facilitate exchange of information and/or data including, for example, voice information (e.g., circuit-switched and/or packet switched voice information), e-mail, text and/or instant messaging, streaming video, streaming audio, hypertext transfer protocol (HTTP) information associated with web-browsing, and the like. Internal and/or external network applications can be used to format transferred data in accord with predefined standards for a particular type of data. For instance, applications can format data representing video information according to a video standard, data representing music and/or ring-tone information according to a associated music and/or ring-tone standards, etc. To provide data exchange services optimized for a particular connection, however, such applications can require information related to a quality of a communication link associated with mobile device 104 and communication network 102, including, e.g., a radio bearer associated with such network and such device.

In general, a radio bearer quality can dictate an optimal manner in which to facilitate data exchange services transferred via a bearer channel. For example, if a bearer channel can support a specific data transfer bandwidth, data exchange services can provide optimal service by ensuring that data transfer associated with the application occurs at a bandwidth substantially equal to the supported bandwidth. Regulating application data transfer at a bandwidth higher than the supported bandwidth can overload mobile device 104 with data (e.g., increasing packet loss at such device and resulting in poor application service), and regulating data transfer at a bandwidth lower than the supported bandwidth can frustrate a mobile subscriber, creating a poor impression of service quality.

Network components (e.g., a serving general packet radio system (GPRS) node (SGSN)) associated with communication network 102 can typically detect and/or enforce quality parameters associated with a particular communication session (e.g., bandwidth, bit-rate, packet loss rate, etc. associated with a communication link). In addition, such quality parameters can be inferred from a network architecture associated with a communication link. For instance, if a mobile device is registered onto a network having a third generation (3G) architecture (e.g., a universal mobile telecommunication system (UMTS) network), it can be inferred that an associated radio bearer is of a type typical for a 3G network. As a more specific example, if a 3G network typically provides a bearer channel having 300 kilobit per second (kbit/s) bandwidth, it can be inferred that a particular communication link to such a network is substantially equivalent to 300 kbit/s. Additionally, if a data-capable second generation (2.5G) network typically provides a bearer channel having 150 kilobit per second (kbit/s) bandwidth, it can be inferred that a particular communication link with a 2.5G network has a bandwidth substantially equivalent to 150 kbit/s. It should be appreciated that the foregoing example is but one of many possible combinations of session quality parameters applicable to the subject disclosure, and that specific example articulated herein should not be construed so as to limit the spirit and scope of the claimed subject matter. Instead, other combinations of network components associated with communication networks and session quality parameters, made known to one of skill in the art by way of the context provided by the subject example, are contemplated as part of the disclosure and incorporate herein.

Analysis component 106 can receive and/or extract information related to a radio bearer associated with communication network 102 and mobile device 104. Such information can include, for instance, an indication of an architecture type related to communication network 102, a measured parameter associated with the radio bearer (e.g., bandwidth, bit-rate, packet loss rate, error rate, etc.) or the like. Analysis component 106 can include components proximate a communication network 102 (e.g., network servers, access points, switches, routers, gateways, data stores, databases, etc.), components proximate mobile device 104, or separate components, or combinations thereof. The information related to a radio bearer can be provided to analysis component 106 by other network components (not depicted) associated with communication network 102, such as an SGSN, a gateway GPRS node (GGSN), a radius server, a wireless application protocol (WAP) gateway, or other network component associated with mobile data exchange, network accounting information, Internet access, inter-network communication, etc.

Analysis component 106 can transfer the information related to a radio bearer to a matching component 108. Matching component 108 can then store and/or submit such information to other entities (e.g., an internal or external application content/service provider, or both, or like entity). Such an entity, for example an external network application, can then provide a service for mobile device 104 in a manner that substantially matches a characteristic of the radio bearer associated with communication network 102 and mobile device 104. The radio bearer information can be submitted by matching component 108, for instance, by including such information within at least a portion of a data packet (e.g., an HTTP packet). Alternatively, matching component 108 can allow other entities to access radio bearer information stored therein in order to provide differentiated services to a mobile device (104), for instance. More specifically matching component 108 can store information related to a radio bearer associated with a communication device (e.g., mobile device 104) registered onto a network (e.g., communication network 102) associated with matching component 108, and provide access to such information to any suitable entity internal and/or external to communication network 102 (e.g., internal and/or external application providers, other network entities, benchmark components, testing components, etc.) Matching component 108 can include one or more network components associated with communication network 102, such as an SGSN, a gateway GPRS node (GGSN), a radius server, a wireless application protocol (WAP) gateway, or other network component associated with mobile data exchange, network accounting information, Internet access, inter-network communication, etc.

It is to be appreciated that communication network 102 can, but is not required to, include a fixed IP network, such as that formed of logical connections to one or more remote computers such as a workstation, laptop, a server computer, a router, a personal computer, portable device, microprocessor-based entertainment device, peer device, or other like network node. Such logical connections can be facilitated via a DSL network, a cable network, an optical fiber network, including a local area network (LAN) and/or wide area network (WAN), and can further provide access to global communications networks e.g. the Internet. Furthermore, access to communication network 102 can include wired (e.g. category 4 and category 5 [CAT-4 and CAT-5 respectively] etc., IEEE 1394, IEEE 802.3 and the like, USB, etc.) connections or wireless (e.g. radio frequency [RF] including "Bluetooth", 802.11 [a, b, g, n, etc.], 802.16x and the like, microwave frequency, optical frequency, and the like) connections or combinations thereof.

It is to be appreciated that communication network 102 can, but is not required to, include wireless access networks such as global system for mobile communication (GSM) networks, time division multiple access (TDMA) networks, code division multiple access (CDMA) networks, such as IS-95 and subsequent iterations of CDMA technology, integrated digital enhanced network (iDEN) networks, universal mobile telecommunication system (UMTS) networks, UMTS VoIP networks, and other implementations of first generation (1G), second generation (2G), advanced second generation (2.5G), third generation and third generation partnership project (3G and 3GPP respectively) networks, subsequent wireless access technologies, as well as like wireless access networks or combinations thereof. Additionally, mobile device 102 can include, but is not required to include, for instance, a communication device, a multi-mode device, a dual-mode device, a dual-mode cellular/IP device, a mobile communication device, a cellular device that connects to a fixed IP network, a smartphone, a gaming device, a home media center, a portable media player, a satellite phone, a desktop device, a cellular phone, a portable gaming device, a mobile phone, a portable music player, a portable device, a laptop, a personal digital assistant, or a handheld or combinations thereof.

Figure 2:
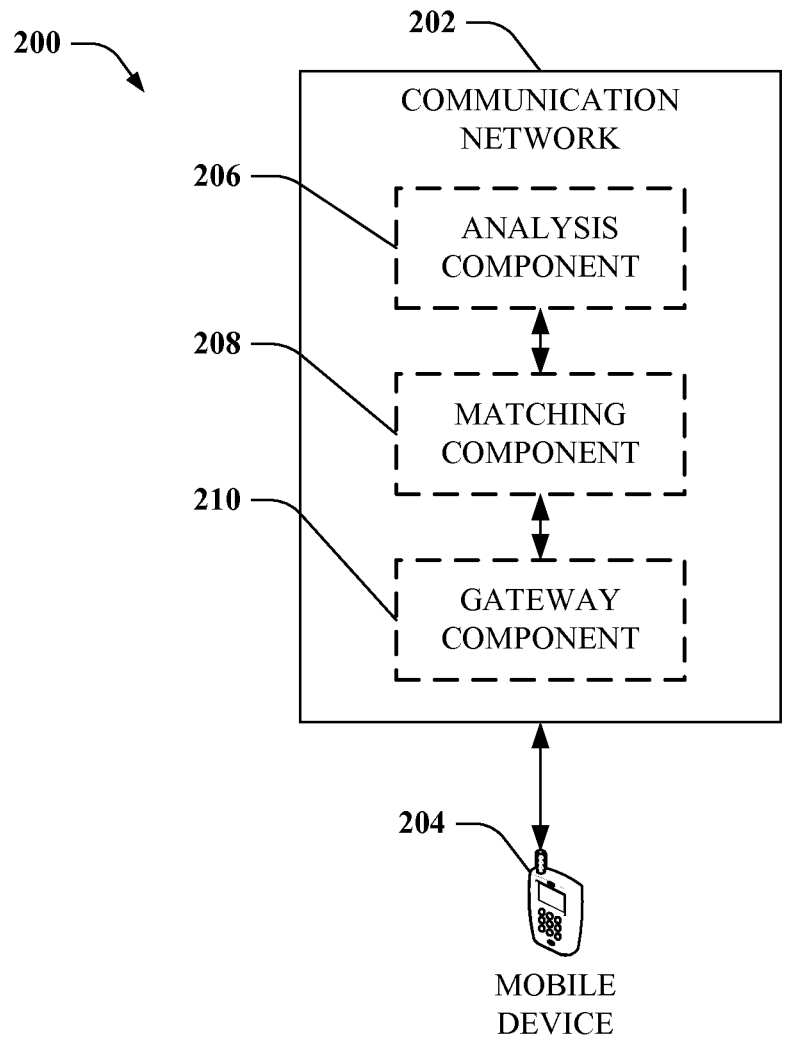
FIG. 2 illustrates an example high-level block diagram of a system that can transmit mobile communication link quality information to an internal or external application.

FIG. 2 depicts an example block diagram of a system 200 that can transmit mobile communication link quality information to an internal or external application. Communication network 202 can be any suitable fixed IP or wireless access communication network as described supra. Likewise, mobile device 204 can be substantially similar to mobile device 104 described supra. Analysis component 206 can receive an indication of communication link quality, related to mobile device 204 and communication network 202, from a communication network component (not depicted) (e.g., an SGSN serving mobile device 204). Matching component 208 can store radio bearer information associated with communication network 202 and mobile device 204 received at analysis component 206. Additionally, matching component 208 can enable internal and/or external network application services to access such stored information. Alternatively, matching component 208 can submit such information to an internal and/or external application (e.g., via a data packet with such information embedded therein, infra). Such submission can occur via any suitable information transfer mechanism, including e.g., circuit-switched electronic transmission, data packet routing, etc. An internal and/or external network application can include any suitable entity internal and/or external to communication network 102 (e.g., internal and/or external application providers, other network entities, benchmark components, testing components, etc.) As a more specific example, an entity providing e-mail services to mobile device 204 can be notified of a information related to a radio bearer associated with such device, and effectuate e-mail services at a level commensurate with such information (e.g., information indicating a radio bearer bandwidth can be utilized to provide e-mail services at a substantially similar bandwidth, as indicated supra). In this manner, an entity can attempt to meet expectations of mobile service subscribes related to application quality of service.

Gateway component 210 can map information related to a radio bearer associated with communication network 202 and mobile device 204 into at least a portion of a data packet (e.g., into a header of an HTTP data packet, or the like). Such mapping can occur via any suitable data packet alteration or generation mechanism. For instance, a data packet received from mobile device 204 requesting network services can be altered to include such mapped information, and then can be routed to an appropriate entity for filling the request. Additionally, such an entity can provide requested services in accord with information mapped into the data packet. As an alternative, gateway component 210 can generate a data packet and include the information related to a radio bearer into such generated data packet so that matching component 208 can then submit the packet and information to a network application.

Figure 3:
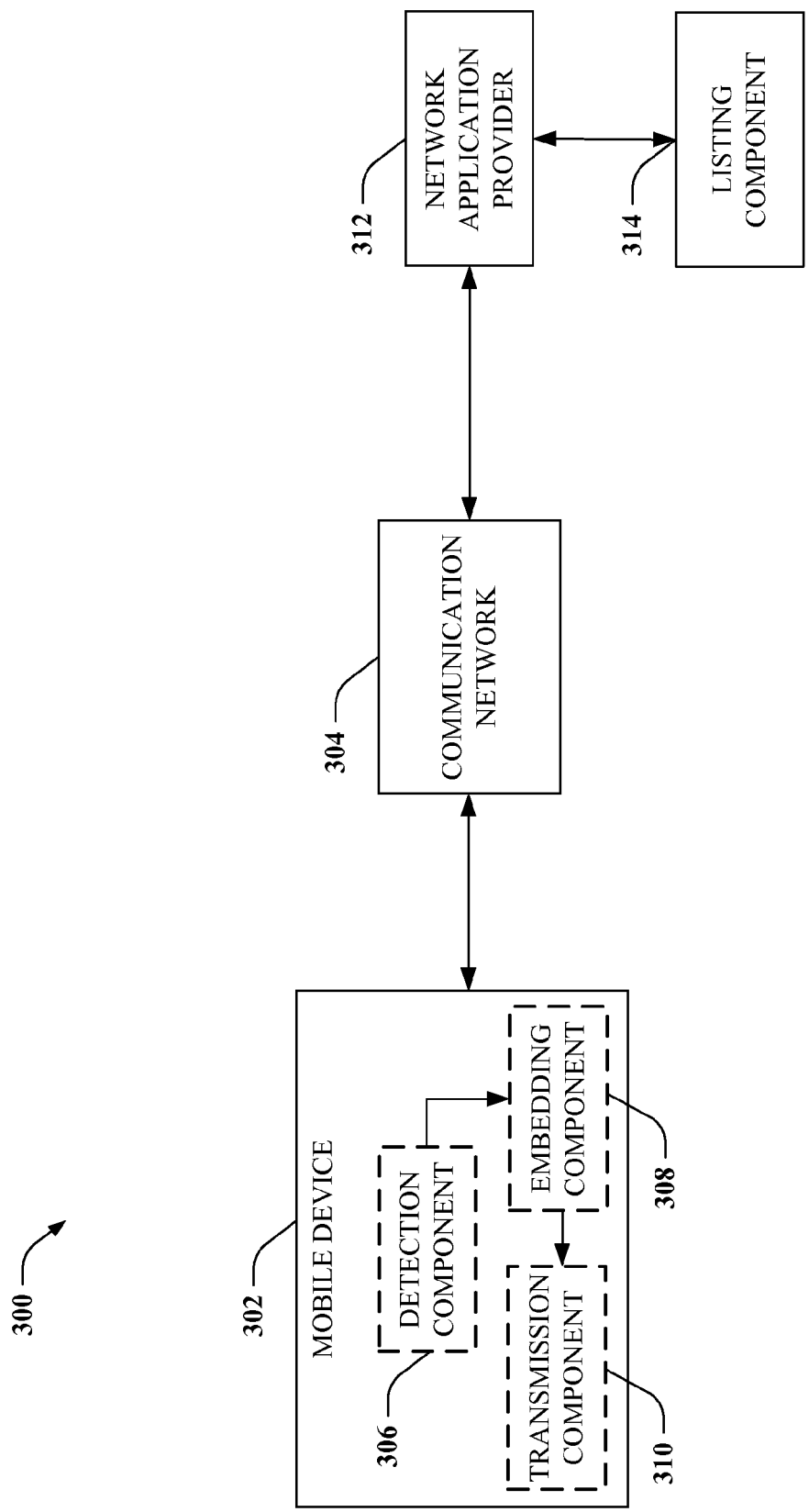
FIG. 3 depicts a sample block diagram of a mobile device that can detect and provide a communication link quality or change in such quality in accord with aspects of the claimed subject matter.

FIG. 3 depicts an example system 300 wherein a mobile device can detect, provide, and periodically update radio bearer information in accord with aspects of the claimed subject matter. Mobile device 302 can include any suitable mobile communication device (supra) that can resister onto a communication network 304 (also as described supra). Detection component 306 can determine information incident to a contemporaneous communication link related to mobile device 302 and communication network 304 (e.g., a radio bearer channel associated with such device and network). Such determination can be by way of a measurement of link quality parameters (e.g., bandwidth, bit-rate, packet loss, latency, or the like, or combinations thereof), by identifying a network architecture associated with communication network 304 and inferring typical quality parameters associated with such an architecture (e.g., second generation (2G), 2.5G, 3G, or subsequent network architecture, or combinations thereof), or like mechanism. Once a determination as to contemporaneous communication link quality is made, detection component can provide such quality information to embedding component 308.

In an alternative scenario, detection component 306 can periodically poll a communication link to determine quality information related thereto. Determination can be made in a substantially similar fashion as describe above. By periodically polling a communication link, detection component can identify a substantial change in communication link quality (e.g., caused by hand-off from one network architecture type to another), and forward information related to the change to embedding component 308. Such information can include, for example, a new bandwidth associated with a radio bearer, a difference in bandwidth effectuated by the change, or similar information.

Embedding component 308 can receive information related to quality of a communication link (e.g., a radio bearer) identified by detection component 306. Such information can take the form of a particular parameter value (e.g., 300 kbit/s bandwidth, 150 kbit/s guaranteed bit-rate, 1% packet loss rate, etc.) or information identifying a particular network architecture (e.g., an IP address of a network SGSN dedicated to a 3G network, or a 2.5G network, etc. or similar method that can identify a network architecture type, supra). Additionally, embedding component can format a portion of a data packet (e.g., an HTTP data packet) so that such portion can specify communication link quality information applicable to data exchange related to mobile device 302 and communication network 304. Alternatively, embedding component 308 can generate a data packet dedicated to indicating the link quality information, where at least a portion of the generated data packet includes and/or indicates such information. Embedding component 308 can then forward such a data packet to a transmission component 310 for transmission to an entity external to mobile device 302. Transmission component 310 can send a data packet (e.g., formatted by embedding component 308) to an external entity such as a communication network (304), device, component, node, etc., via a wired or wireless communication link (supra), to apprise the entity of quality information related to a communication link.

Communication network 304 can receive a formatted data packet from mobile device 302, and can forward such a data packet to a network application provider 312. The formatted data packet can be interpreted and quality information embedded therein extracted by network application provider 312. Such information can be used, for example, to optimize application data exchange services in accord with a contemporaneous communication link quality (e.g., by providing a streaming video service at a bandwidth substantially equivalent to a maximum bandwidth supported by a contemporaneous communication link). In particular aspects, a listing component 314 can generate a list of IP addresses associated with network SGSN components dedicated to a particular network architecture type. The list of IP addresses of dedicated SGSNs can be sent to network application provider 312. If a data packet sent by mobile device 302 contains such an IP address, network application provider 312 can reference the list of SGSN IP addresses to determine whether it is dedicated to a particular network architecture type. If so, a contemporaneous quality associated with a communication link (e.g., radio bearer channel bandwidth) can be inferred from quality parameters typical for the network architecture type. Network application provider 312 can then regulate application data exchange associated with mobile device 302 accordingly (e.g., by routing data to mobile device 302 at a bandwidth that matches a radio bearer bandwidth). Additionally, listing component 314 can periodically update the list of IP addresses of dedicated SGSNs sent to network application provider 312 as network components and/or IP addresses change.

According to additional aspects, system 300 can enable network application provider 312 to alter application data services to match a change in communication link quality. If mobile device 302, as a result of periodically polling a quality of a communication link as described above, transmits a formatted data packet indicating a substantial change in such quality, network application provider 312 can alter application data exchange services accordingly. Consequently, system 300 can provide appropriate application data exchange parameters for a concurrent communication link, even if a quality of such a link changes during a session. Additionally, system 300 can optionally utilize other methods, e.g., transmission control protocol (TCP) window control, real time control protocol (RTCP) flow control, or like mechanisms to manage mid-session changes (e.g., a mid-session radio bearer-type change, infra).

Figure 4:
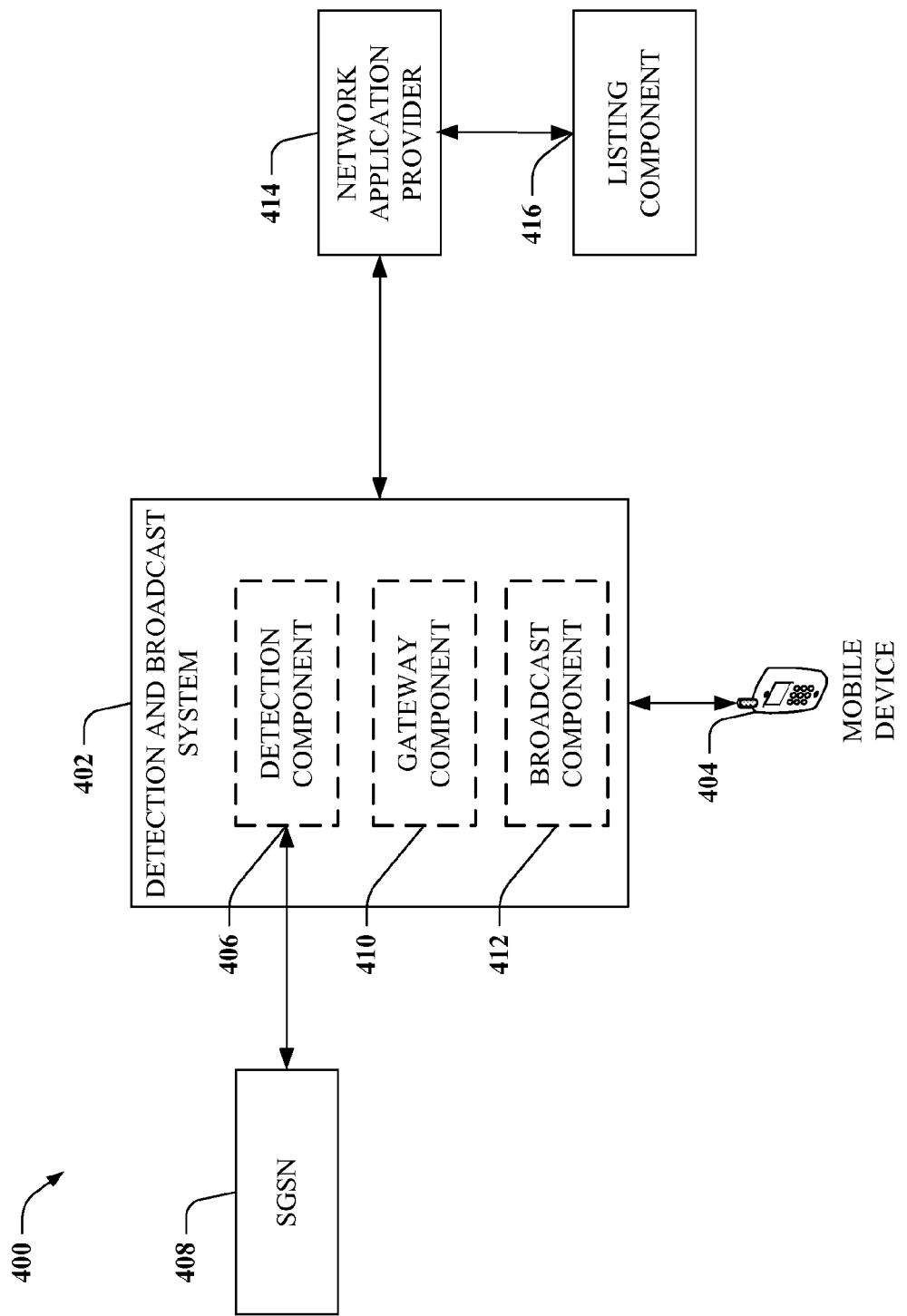
FIG. 4 illustrates a sample block diagram of a system that can detect changes in communication link quality associated with a mobile device and broadcast contemporaneous link quality in accord with various aspects of the claimed subject matter.

FIG. 4 depicts a system that can identify a substantial change in the information related to a radio bearer and broadcast such information in accord with various aspects of the claimed subject matter. Detection and broadcast system 402 can include components proximate a communication network (not shown), proximate a mobile device 404, or separate from both, or combinations thereof. Such components can include a detection component 406, a gateway component 410, and a broadcast component 412.

Detection component 406 can detect information related to a radio bearer associated with a mobile device 404 and a communication network. In addition, detection component 406 can periodically poll the radio bearer to identify substantial changes in connection quality (e.g., as typically evidenced as a result of a handover from a 3G bearer to a 2.5G bearer, or vice versa). Furthermore, detection component 406 can associate with an internal network component, e.g., SGSN 408, which is dedicated to a particular type of network architecture. SGSN 408 can include, for example, an SGSN dedicated to a UMTS, GPRS, or EDGE network, or combination thereof, as described supra. Additionally, SGSN 408 can be a non-dedicated SGSN that can provide service for multiple network architectures (e.g., 2G/2.5G, 2G/3G, 2.5G/3G, etc.) and generate a radio access technology information element (RAT IE). The RAT IE generated by SGSN 408 can specify a network architecture type associated with a radio bearer link, specific quality information associated with a radio bearer link, or both, or specify similar connection quality information related to a bearer channel. Detection component 406 can forward information related to a radio bearer associated with a mobile device 404 and a communication network to gateway component 410 for further handling.

Gateway component 410 can receive information related to a radio bearer and map it to a data packet for transmission to other entities including, for instance, components of a communication network, an internal or external network application provider 414, or like entity. Mapped information can be included within a formatted portion of a data packet (e.g., a data packet header) so as to specify to a subsequent entity, capable of interpreting at least the formatted portion, the information related to the radio bearer. Such a data packet can be routed through gateway component 410 and intended for other network purposes (e.g., a packet transmitted by mobile device 404 evoking a universal resource indicator (URI) to query data from a network database, application server, etc.) or generated by gateway component 410 for the purpose of delivering the communication link quality information. Additionally, gateway component 410 can incorporate one or more network components including, e.g., an SGSN, a gateway GPRS node (GGSN), a radius server, a wireless application protocol (WAP) gateway, or other network component associated with mobile data exchange, network accounting information, Internet access, inter-network communication, etc.

Gateway component 410 can provide a formatted data packet to broadcast component 412. Broadcast component 412 can contain addressing information related to other entities connected to a network (e.g., network application provider 414) in order to distribute the formatted data packet so such entities. Additionally, broadcast component can simply transmit the formatted data packet and substantially similar data packets periodically across the network, as a data 'broadcast'. Entities operatively disposed in data communication with detection and broadcast system 402 (e.g., network application provider 414) or a network associated therewith, can therefore receive a broadcast data packet, or substantially similar version, and obtain radio bearer (e.g., bandwidth information) information associated with mobile device 404. In such a manner network application provider 414 and other entities can obtain and store the broadcast information and utilize it if mobile device 404 activates a communication service associated with such an entity.

In accord with particular aspects of the claimed subject matter, listing component 416 can maintain a list of SGSN IP addresses (e.g., related to SGSN 408) dedicated to a particular network architecture type. Such a list can be updated periodically, and provided to network application provider 414, or like entity. If a data packet is received specifying an IP address of a dedicated SGSN, network application provider 414 can determine that mobile device 404 is connected via that particular network architecture. Consequently, radio bearer information typically associated with such architecture (e.g., 3G, 2.5G, 2G, or the like) can be used to infer that mobile device 404 is associated with a substantially similar bearer channel. Additionally, if network application provider 414 receives a subsequent data packet related to mobile device 404 indicating an SGSN IP address dedicated to a different network architecture type, application data services can be adjusted in accord with typical bearer attributes associated with the different architecture type.

As an additional example, detection and broadcast system 402 can associate with a network component that can generate a RAT IE message containing information about a radio bearer channel (as specified supra). Such a message can be received at detection component 406, incorporated into a data packet at gateway component 410, and broadcast (e.g., at broadcast component 412) so as to indicate radio bearer information independent of a type of SGSN (e.g., dedicated to a particular network architecture type, or multi-type, etc.) associated with mobile device 404.

Figure 5:
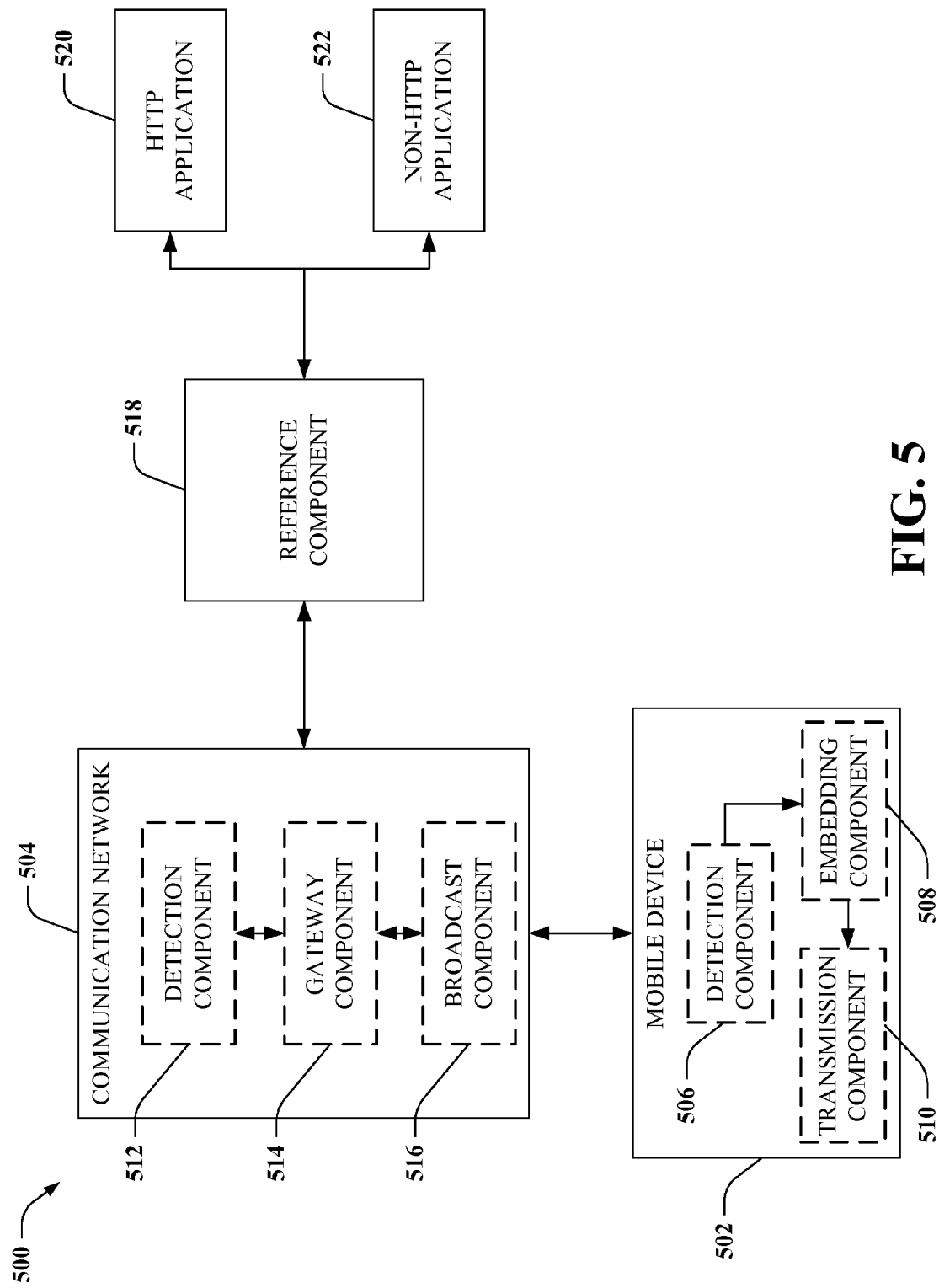
FIG. 5 illustrates an example block diagram of a system that can detect, update and store communication link quality information in accord with various aspects disclosed herein.

FIG. 5 illustrates an exemplary system 500 that can detect, update and store communication link (e.g., a radio bearer channel) quality information in accord with various aspects disclosed herein. Mobile device 502 can be a mobile communication device capable of exchanging data and/or voice information over a communication network 504, as described supra. Communication network 504 can be any suitable network operatively disposed to communicate with various electronic devices (e.g., mobile device 502) as described supra. Mobile device 502 can include a detection component capable of determining and/or periodically polling a quality of a communication link associated with mobile device 502, as described herein. Such quality can be indicated via particular quality parameter values (e.g., bandwidth, bit-rate, error-rate, packet loss, etc.), a dedicated SGSN IP address and/or RAT IE message indicating a network architecture type, or substantially similar method, or combinations thereof. Furthermore, such indication can be updated to specify a change in the quality of a communication link (e.g., a change in bandwidth associated with a bearer channel, such as a radio bearer channel). For example, a new bandwidth associated with a new radio bearer can be specified, a difference in bandwidth effectuated by the change in bearer or bandwidth quality of such bearer can be specified, etc.

Embedding component 508 can format at least a portion of one or more data packets (e.g., an HTTP data packet header) so as to specify and/or update a concurrent link quality as determined by detection component 506. Transmission component 510 can transmit and/or broadcast at least the formatted portion of one or more data packets to other communication entities (e.g., communication network 504, a service provider, an application, another mobile device, or like device, network, and/or service provider, or combinations thereof). Such transmission can occur, for example, when an application is activated via a message (e.g., an HTTP message) originating at mobile device 502, when mobile device 502 registers onto a network, when a change in link quality is detected by detection component 506, or combinations of these and like circumstances. Transmission component 510 can forward at least a formatted portion of the one or more data packets (e.g., along with or included within an HTTP message) to an entity related to an application, and/or to reference component 518. In a substantially similar fashion, detection component 512, gateway component 514, and broadcast component 516 can also detect, prepare for transmission, broadcast and/or update information related to a communication link associated with mobile device 502. The broadcast can be directed at a single entity, multiple entities, or broadcast across one or more networks to an unspecified number of entities, and/or to reference component 518.

Reference component 518 can receive, store, and provide access to data related to a communication link quality (e.g., bandwidth) associated with mobile device 502. Such information can be updated at reference component 518 over time, for instance, periodically, as a result of a detected change in communication link quality associated with mobile device 502 (e.g., detected by detection components 506 and/or 512) or the like. In addition, reference component 518 can receive at least a formatted portion of a data packet (e.g., an HTTP data packet) and store information specified therein (e.g., a list of IP addresses associated with a dedicated network SGSN, supra) related to a communication link quality associated with mobile device 502. Furthermore, reference component 518 can provide access to information stored thereon to network-related entities, such as an internal and/or external network application (e.g., HTTP application 520, non-HTTP application 522, or like applications). Reference component 518 can maintain link information associated with mobile devices (e.g., mobile device 502) in one or more formats recognizable by HTTP application 520 and non-HTTP application 522. Reference component 518, therefore, enables applications to obtain link information associated with devices without interpreting a formatted data packet transmitted by transmission component 510 and/or broadcast component 516.

Additionally, reference component 518 can update link quality information (e.g., a list of IP addresses stored therein) during a mobile session, in between mobile sessions, or both, as additional formatted data packets are received. Consequently, applications (e.g., HTTP application 520 and/or non-HTTP application 522) can periodically refer to information stored within reference component 518 to determine information related to communication link quality during a session, in between sessions, or both, and modify applications and/or application services accordingly. For example, reference component 518 can update a list of IP addresses associated with dedicated network SGSNs (e.g., that indicate a radio bearer architecture type, such as a 3G bearer, etc., as describe supra). More specifically, reference component 518 can add (or, for example, delete) an IP address associated with a dedicated UMTS, GPRS, or EDGE SGSN, newly assigned to such SGSN (or, for example, no longer assigned to such SGSN), for instance, to accurately reflect concurrent SGSNs associated with a network. It should also be appreciated that reference component 518 can exchange data with non-WAP based applications and secure socket layer such as HTTPS or similar encryption protocol based applications as well as various other data transfer protocols suitable for network communication.

Figure 6:
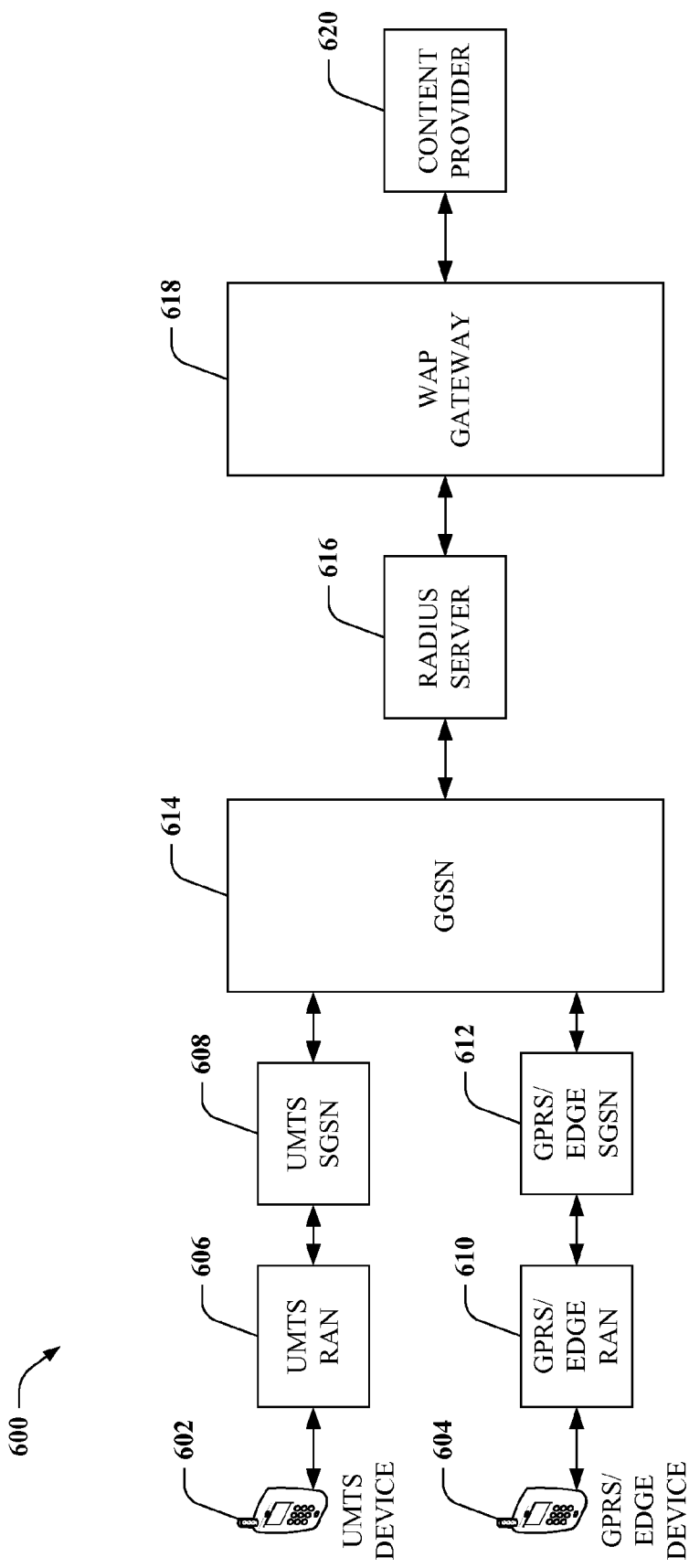
FIG. 6 illustrates a block diagram of an example system that provides network architecture information associated with a mobile communication link to an application content provider in accord with particular aspects disclosed herein.

FIG. 6 illustrates an example system 600 that provides network architecture information associated with a mobile communication link (e.g., a radio bearer channel) to an application content provider in accord with particular aspects disclosed herein. UMTS device 602 can be any suitable mobile device capable of registering onto and exchanging data with a UMTS network (e.g., UMTS radio access network (RAN) 606). GPRS/enhanced data rate for global revolution (EDGE) device 604 can be any suitable mobile device capable of registering onto and exchanging data with a GPRS network, an EDGE network, or both (e.g., GPRS/EDGE RAN 610). UMTS RAN 606 is a 3G radio access communication network designed as a successor to the 2G global system for mobile communication (GSM) network. UMTS RAN 606 has one or more UMTS SGSNs (608) associated with it, that can provide access, routing, encoding/decoding, mobility, billing and like services for UMTS device 602 in connection with data exchange over a GPRS core mobile communication network (of which UMTS SGSN 608, GPRS/EDGE SGSN 612, GGSN 614, and radius server 616 can form a part). GPRS/EDGE RAN 610 can include portions of the GSM core network (not depicted) and portions of an EDGE enhanced data transfer network; particularly, network components that provide access to mobile devices (e.g., GRPS/EDGE device 604) that utilize the GSM/EDGE core network(s). GPRS/EDGE SGSN 612 can act as an interface between a GSM/EDGE network and the GPRS core network, carrying information related to GPRS/EDGE device 604, and more specifically can provide access, routing, encryption/decryption, mobility, billing and like services related to data exchange via a GRPS/EDGE network access point and GRPS core network interface.

An SGSN (e.g., UMTS SGSN 608, GPRS/EDGE SGSN 612) can typically be associated with a radio bearer established to effectuate logical communication according to specified quality parameters including, for example, network signaling, data transport, quality management functions, etc. A radio bearer can typically have different properties according to a network establishing such bearer (e.g., UMTS network, GRPS/GSM network, EDGE network, etc.) An SGSN serving a mobile device can typically access such radio bearer information; additionally, knowing a type of SGSN (e.g., a UMTS SGSN (608), a GRPS/EDGE SGSN (612), or the like) can typically be sufficient to infer a radio bearer as well. Some exceptions exist, however, for non-dedicated SGSNs. If an SGSN can mediate between the GPRS core network and more than one access network, such as both a UMTS network and a GPRS/EDGE network, then simply identifying an SGSN is insufficient to determine a type of radio bearer (e.g., UMTS or GRPS/EDGE) associated with a mobile device (e.g., UMTS device 602 and/or GPRS/EDGE device 604). For such non-dedicated SGSNs, further information can be required to indicate a radio bearer type. A case in which UMTS SGSN 608 and GPRS/EDGE SGSN 612 are dedicated to a UMTS and GPRS/EDGE network is discussed first. Subsequently, a case in which UMTS SGSN 608 and/or GPRS/EDGE SGSN 612 can accommodate either a 2/2.5G (GPRS/GSM/EDGE) network device and/or a 3G (UMTS) network device is discussed.

UMTS device 602 and/or GPRS/EDGE device 604 can activate communication services (e.g., voice communication, data exchange with a UMTS network, data exchange with the Internet and/or an IP-based intranet, or applications services associated with data exchange, or combinations thereof) by initiating a packet data protocol (PDP) context message. A PDP context message can be initiated, for instance, by activating (e.g., clicking on a user interface button, etc.) a URL on a wireless application protocol (WAP) browser displayed on a mobile device (not shown) (e.g., UMTS device 602, GPRS/EDGE device 604, etc.) Such PDP context message is received at a radio access network servicing such device (e.g., UMTS RAN 606 and/or GPRS/EDGE RAN 610) and forwarded to an appropriate SGSN (e.g., UMTS SGSN 608 and/or GPRS/EDGE SGSN 612). UMTS SGSN 608 and/or GPRS/EDGE SGSN 612 can receive such PDP context message and forward it to a gateway GSN (GGSN 614) along with an IP address associated with the forwarding SGSN.

A GGSN (e.g., GGSN 614) can typically include an IP address associated with an SGSN into a radius accounting message forwarded from GGSN 614 to a radius server (e.g., radius server 616) for accounting and billing purposes related to a mobile device. To illustrate, a UMTS radio bearer, established by UMTS SGSN 608, can provide a relatively high bandwidth communication link for UMTS device 602 (as compared, for example, with a communication link bandwidth provided by GPRS/EDGE SGSN 612 for GPRS/EDGE device 604). Such a bandwidth can form a basis for charging information associated with data exchange directed to UMTS device 602. Therefore, an IP address associated with an SGSN dedicated to a particular network architecture can typically be sent to and stored at a radius server (e.g., radius server 616) to facilitate accurate charging functions.

Radius server 616 can forward a radius accounting message, received from GGSN 614 and containing an IP address associated with UMTS SGSN 608 and/or GPRS/EDGE SGSN 612, to WAP gateway 618. WAP gateway 618 can act as a gateway between a mobile network and an IP network. Consequently, WAP gateway 618 can typically route, encrypt, decrypt etc. IP network-based packet information (e.g., HTTP data packet protocol, etc.) to wireless-IP packet protocols (e.g., GPRS tunneling protocol (GTP) utilized by a mobile network and vice versa). WAP gateway 618, therefore, can form a basis for a UMTS device 602 and GPRS/EDGE device 604 to access an IP-based network and exchange data therewith, execute applications associated with such data exchange, etc. Additionally, WAP gateway 618 can map an IP address of an SGSN (e.g., UMTS SGSN 608 and/or GPRS/EDGE SGSN 612) received at WAP gateway 618 within a radius accounting message, into at least a portion of an IP-based data packet (e.g., an HTTP data packet header), and forward such data packet to a content provider 620. It should be appreciated that WAP gateway 618 might not be able to forward a packet to a non-WAP based application. In such a case, a data services delivery node (DSDN) (e.g., performing a function similar to that described by reference component 518, supra) can optionally be utilized instead for non-WAP applications. Furthermore, DSDN can be utilized in conjunction with secure socket layer, or HTTPS, protocols, which a WAP-based gateway (e.g., WAP gateway 618) might be unable to process.

Content provider 620 can be any internal and/or external network application provider that can facilitate data exchange formatted in conjunction with particular data applications (e.g., streaming video, e-mail, instant messaging, Internet URL access, downloading particular data files, such as ringtone files, music files, video files, etc.) Content provider 620 can generally establish a data exchange bandwidth for application services. An appropriate bandwidth for application services can be, for instance, a bandwidth comparable to that associated with a device/network connection.

To illustrate application and network connection bandwidth by example, a UMTS SGSN (608) facilitating access to a UMTS network can typically support bandwidths up to 300 kbit/s. Consequently, 300 kbit/s can be an appropriate application data exchange bandwidth, for a streaming video application for instance, for mobile device 602 if connected to UMTS RAN 606 and UMTS SGSN 608. In contrast, GPRS/EDGE SGSN 612 can typically provide a bandwidth substantially similar to 60 kbit/s and 150 kbit/s respectively for GPRS/EDGE device 604. If content provider 620 were to establish an application data exchange bandwidth for GPRS/EDGE device 604 at a typical UMTS bandwidth of 300 kbit/s, much information could be lost, resulting in potentially poor application service. Additionally, if content provider 620 establishes application data exchange services for UMTS device 602 at a lower bandwidth rate (e.g., typical for GPRS/EDGE connections), a subscriber can be disappointed with such services as well. Thus, it is beneficial for a content provider 620 to have an indication of a communication link bandwidth between a device (602 and/or 603) and a network (606 and/or 610) to provide application services at a comparable bandwidth.

System 600 can provide a radio bearer-type associated with a mobile communication session to content provider 620. More specifically, content provider 620 can have a list of IP addresses associated with UMTS-dedicated SGSNs (e.g., UMTS SGSN 608). Further, content provider 620 can extract an IP address from a data packet formatted by WAP gateway 618. If such extracted IP address is on the list of UMTS-dedicated IP addresses, content provider 620 can infer that an SGSN (608) serving a mobile device (602) is a UMTS-dedicated SGSN. Consequently, content provider 620 can establish application services requested by a mobile device (602) (e.g., as specified within a PDP context message) at a bandwidth typical for a UMTS communication link. If an SGSN IP address extracted from the formatted data packet is not on the list of UMTS-dedicated IP addresses, content provider can infer that an SGSN (612) serving a mobile device (604) is a GPRS/EDGE SGSN. Furthermore, content provider 620 can establish application services at a bandwidth typical for a GPRS or EDGE (or some intermediary bandwidth) communication link.

In accord with additional aspects of the disclosed subject matter, system 600 can provide radio bearer-type information to a content provider 620 for non-dedicated SGSNs. A non-dedicated SGSN (608) can establish a communication link between the GPRS core network and a UMTS device or GPRS/EDGE device. Consequently, an IP address associated with such an SGSN is insufficient to determine whether a device initiating a PDP context message is connected via a UMTS communication link or a GPRS/EDGE communication link. Therefore, UMTS SGSN 608 and GPRS/EDGE SGSN 612 as well as GGSN 614 and radius server 616 can support a radio access technology information element (RAT IE) message that can specify whether a radio bearer associated with a mobile device (602 and/or 604) is a UMTS or GPRS/EDGE bearer (e.g., as specified by third generation partnership project (3GPP) Release 6.0).

UMTS SGSN 608 and/or GPRS/EDGE SGSN 612 can obtain and forward a RAT IE message specifying a radio bearer-type associated with UMTS device 602 and/or GPRS/EDGE device 604 to GGSN 614. GGSN 614 can include the RAT IE message into protocol information transmitted between GGSN 614 and radius server 616 (e.g., a radius accounting message). Such protocol information containing the RAT IE message can then be forwarded from radius server 616 to WAP gateway 618, in a substantially similar manner as described above in relation to an IP address associated with an SGSN.

WAP gateway 618 can extract a radio bearer-type from protocol information received from radius server 616 and map the radio bearer-type into at least a portion of a data packet transmitted to content provider 620 (e.g., a data packet being routed to content provider 620 as a result of a PDP context message generated at a device (602 and/or 604) or a data packet generated at WAP gateway, or another network component, for the purpose of indicating a radio bearer-type to content provider 620). Content provider 620 can receive such data packet, or portion thereof, sent by WAP gateway 618 and extract at least a RAT IE message incorporated therein. Further, content provider 620 can extract a radio bearer-type from such RAT IE message, and infer an appropriate bandwidth for application data services routed to UMTS device 602 and/or GPRS/EDGE device 604. It should be appreciated that system 600 can incorporate at least a RAT IE message or an SGSN IP address, or both, into protocol information (e.g., a radius accounting message) and into one or more data packets (e.g., sent by WAP gateway 618 to content provider 620) as well as like information that can indicate a radio bearer-type to an internal or external application (e.g., content provider 620).

It should be further appreciated that system 600 (at least in the dedicated SGSN scenario, described above) can assist in identifying a mobile device that is roaming out of a home network. For example, a list of UMTS-dedicated SGSN IP addresses maintained by content provider 620 (e.g., provided by a network operator) as specified above, can further contain a list of GPRS/EDGE-dedicated SGSN IP addresses in addition to the UMTS-dedicated SGSN IP addresses. An IP address associated with an SGSN, contained within a formatted data packet forwarded by WAP gateway 618, for instance, can be received at content provider 620 in a manner substantially similar to that described above. Such IP address can be checked against the list maintained by content provider 620 to determine if the IP address is associated with a UMTS-dedicated SGSN. If such IP address is not associated with a UMTS SGSN, content provider 620 can further check the list to determine whether the IP address is associated with a GPRS/EDGE-dedicated SGSN. If not, then content provider 620 can assume an SGSN supporting communication with a mobile device is not associated with a home network, and consequently such mobile device is roaming.

Figure 7:
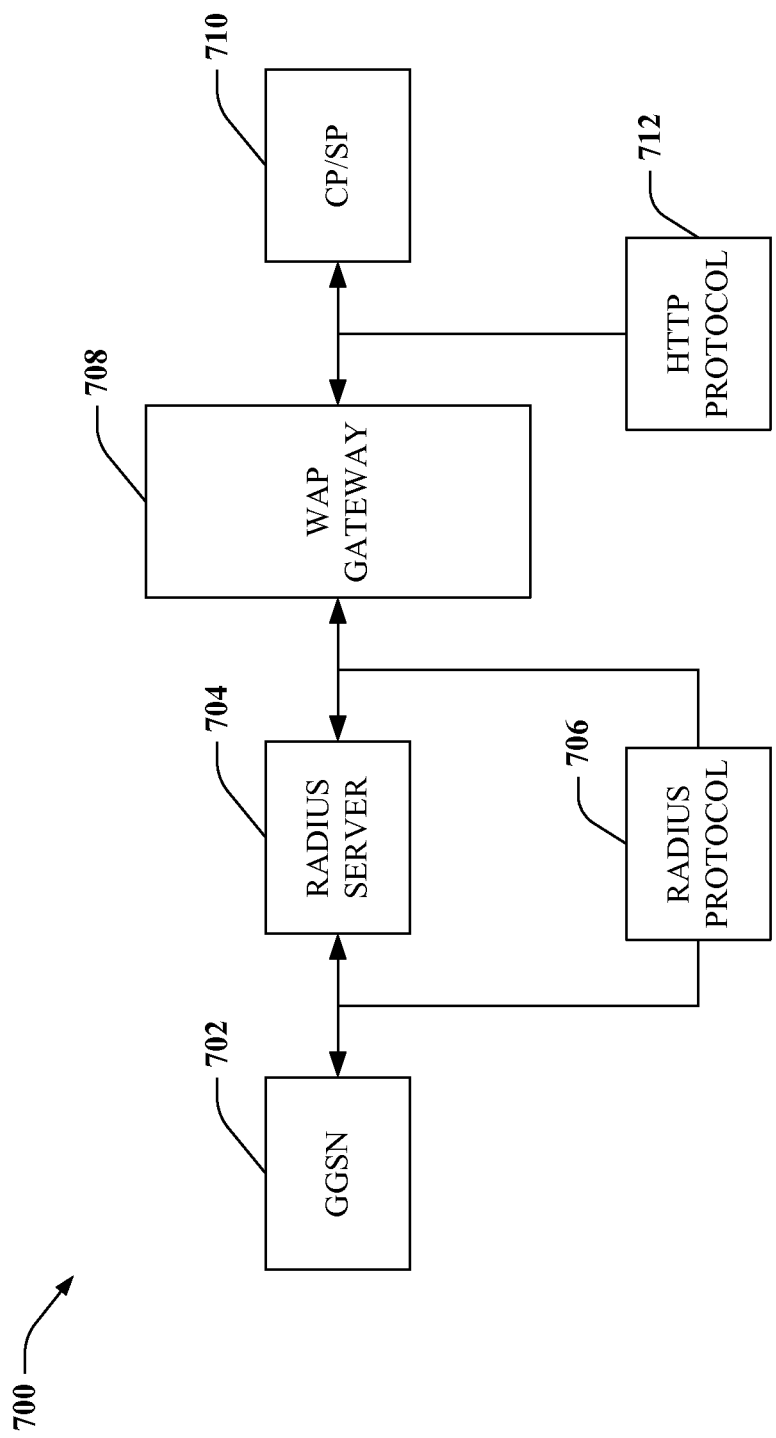
FIG. 7 depicts an example block diagram illustrating transfer protocols between various system components in conjunction with aspects of the claimed subject matter.

FIG. 7 illustrates an example of transfer protocols transmitted between various system components in conjunction with aspects of the claimed subject matter. GGSN 702 can be a gateway SGN typically utilized within a GPRS core network to route, encrypt, decrypt, etc., device communication and/or accounting information (e.g., charging data) between one or more SGSNs serving a device(s) and mobile or fixed IP-based networks, or both, connected to GGSN 702. GGSN 702 can typically communication with a radius server 704 by way of a radius protocol 706. Radius protocol 706 can generally be an authentication, authorization and accounting protocol typically used in conjunction with applications such as network access and/or IP mobility. It can be effective for such applications in both local and roaming scenarios. Radius protocol 706 can be utilized to transfer identification information (e.g., a username and password associated with a communication device, subscription account, subscription service(s), etc.) to radius server 704 for access to an IP network, such as the Internet, and access to application services associated with a network subscription. Furthermore, information indicating a radio bearer-type associated with a mobile device (not shown) can be included within such identification information via radius protocol 706.

Radius server 704 can store data-transfer and like usage information (e.g., call detail records) related to data exchange. Such information can be used for billing purposes, and can incorporate on a radio bearer-type associated with a mobile device (e.g., a UMTS bearer, a GPRS/EDGE bearer, etc.). Such bearer-type can be indicated, for instance, by an SGSN IP address associated with a dedicated network SGSN, or by a RAT IE message for dedicated and/or non-dedicated network SGSNs. Radius server 704 can receive such information, extract it from a radius protocol 706 message, and forward it to a WAP gateway 708 via radius protocol 706. WAP gateway 708 is a gateway component that mediates between a mobile network, and associated mobile devices, utilizing a WAP protocol and a fixed IP-based network such as the Internet or a local or wide area intranet. WAP gateway 708 can route data between such networks similar to a proxy device, translating Internet data into a form suitable for mobile devices (e.g., utilizing a wireless markup language [WML]). WAP gateway 708 therefore can forward requests submitted by a mobile device to a fixed IP-based network component, and/or application content/service provider, e.g., CP/SP 710, via an HTTP protocol 712. Consequently, radio bearer-type information specified via radius protocol 706 and delivered by radius server 704 to WAP gateway 708, can be translated into a HTTP protocol 712 (or similar protocol) generally utilized by an Internet-based CP/SP 710. In such a manner, bandwidth information that can be inferred from such radio bearer-type can be obtained by CP/SP 710 and utilized for application data exchange services associated therewith.

Figure 8:
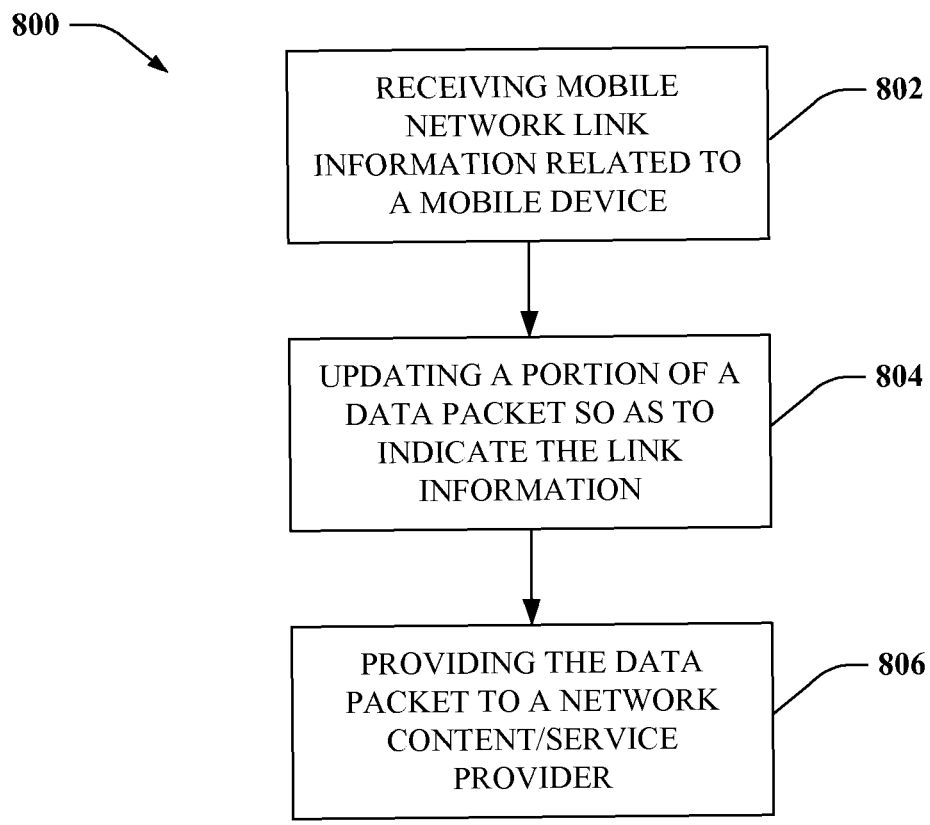
FIG. 8 illustrates an example methodology for providing mobile network link information applicable to network transfer applications in accord with aspects of the subject innovation.

Referring now to FIG. 8, an example methodology is illustrated in accordance with the subject innovation. While, for purposes of simplicity of explanation, the methodologies are shown and described as a series of acts, it is to be understood and appreciated that the claimed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

FIG. 8 illustrates an example methodology for providing mobile network link information applicable to network transfer applications in accord with aspects of the subject innovation. At 802, mobile network link (e.g., a radio bearer) information related to a mobile device and a communication network is received. The mobile device can include, but is not required to include, for instance, a communication device, a multi-mode device, a dual-mode device, a dual-mode cellular/IP device, a mobile communication device, and/or similar communication devices described supra. Network link information can be associated with a logical and/or wireless connection for data exchange between the mobile device and a communication network. Such network can include, but is not required to include, a fixed IP network or a wireless access network as described supra. The mobile network link information can include, for example, quality information associated with such link (e.g., bandwidth, bit-rate, error rate, packet loss rate, jitter, etc.), network architecture information associated with such link (e.g., expressed as an SGSN IP address of a dedicated SGSN, or a RAT IE message etc.), a radio bearer-type associated with such link, or similar information.

At 804, at least a portion of a data packet is updated so as to indicate the mobile network link information. The data packet can be, for example, an HTTP data packet; the portion of a data packet can be an HTTP packet header, for instance. In addition, the data packet can be associated with a service request initiated at a mobile device, or can be a packet generated specifically to bear the link information. At 806, the updated data packet is provided to a network content/service provider. Such content/server provider can extract the link information contained within the at least a portion of a data packet to provide differentiated services for a mobile device. More specifically, differentiated services can include at least an appropriate application data exchange bandwidth for a mobile link between a mobile device and a network.

Figure 9:
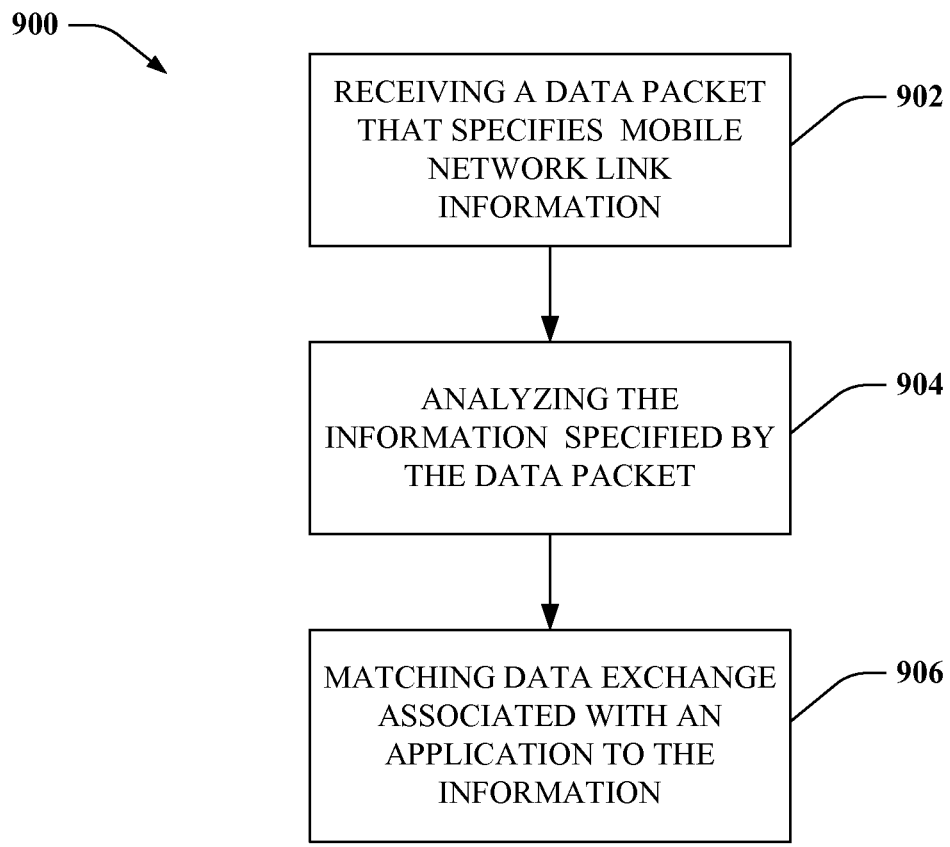
FIG. 9 illustrates a sample methodology for providing application data exchange appropriate for a mobile network link in accord with the disclosed subject matter.

FIG. 9 illustrates a sample methodology for providing application data exchange appropriate for a mobile network link in accord with the disclosed subject matter. At 902, a data packet that specifies mobile network link (e.g., radio bearer) information associated with a mobile device is received. More specifically, the mobile network link information can relate to a communication link between a mobile device and a communication network. Further, the link information can include, for example, quality information, network architecture information and/or radio bearer-type information associated with such link. The data packet can, for instance, be associated with information routed from a wireless access network, and associated device, to a fixed IP network via a gateway device. Alternatively, the data packet can be a packet generated at a gateway device for the purpose of indicating mobile network link information to another entity. At 904, the mobile network link information, specified by the data packet, is analyzed. A network entity or entity external to a network, or both, can do such analysis to extract or otherwise obtain the mobile network link information associated with the mobile device. At 906, data exchange associated with a network data-transfer application is matched to a characteristic related to the mobile network link information. The data exchange associated with a network application can include, for example, streaming video, streaming audio, e-mail, downloading data from a fixed IP-based network data store, etc. In addition, the characteristic related to the mobile network link information can include, for instance, a data exchange bandwidth associated with a radio bearer.

Figure 10:
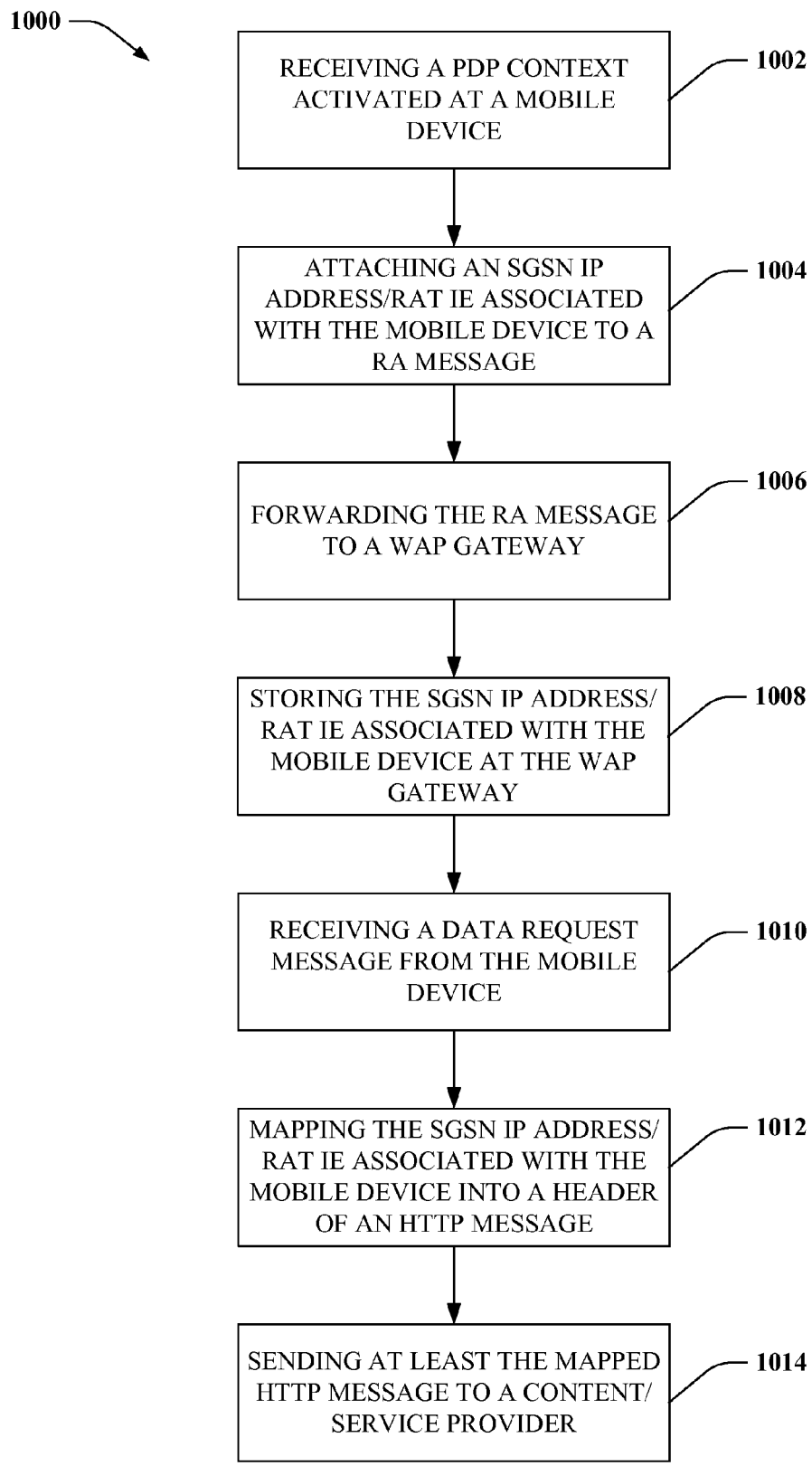
FIG. 10 illustrates a sample methodology for indicating network architecture information associated with a mobile communication in accord with aspects disclosed herein.

FIG. 10 illustrates a sample methodology for indicating network architecture information associated with a mobile communication in accord with aspects disclosed herein. At 1002, a PDP context message, activated at a mobile device, can be received. At 1004, an IP address of an SGSN and/or a RAT IE message associated with a mobile device can be attached to a radius accounting (RA) message. The RA message can use a standard authentication/authorization protocol including, for example, a radius protocol. At 1006, the RA message can be forwarded to a WAP gateway. The WAP gateway can be a device capable of managing data exchange between a mobile network using a first, mobile communication protocol, and a fixed IP-based network (e.g., the Internet) using a second communication protocol, different from the first. At 1008, the WAP gateway can store an SGSN IP address and/or RAT IE message associated with the mobile device. At 1010, a data request message (e.g., an HTTP 'Get' message) can be received at the WAP gateway from the mobile device. The data request message can be a command delivered by a WAP browser of a mobile device requesting information from a fixed IP-based network (e.g., the Internet) component. At 1012, the SGSN IP address and/or RAT IE message associated with the mobile device can be mapped into a header of an HTTP message (e.g., a data packet). At 1014, at least the mapped portion of the HTTP message can be forwarded to an application content/service provider. Such content/service provider can utilize the SGSN IP address and/or RAT IE message to provide application data exchange to a mobile device at an appropriate rate for a particular mobile link.

Figure 11:
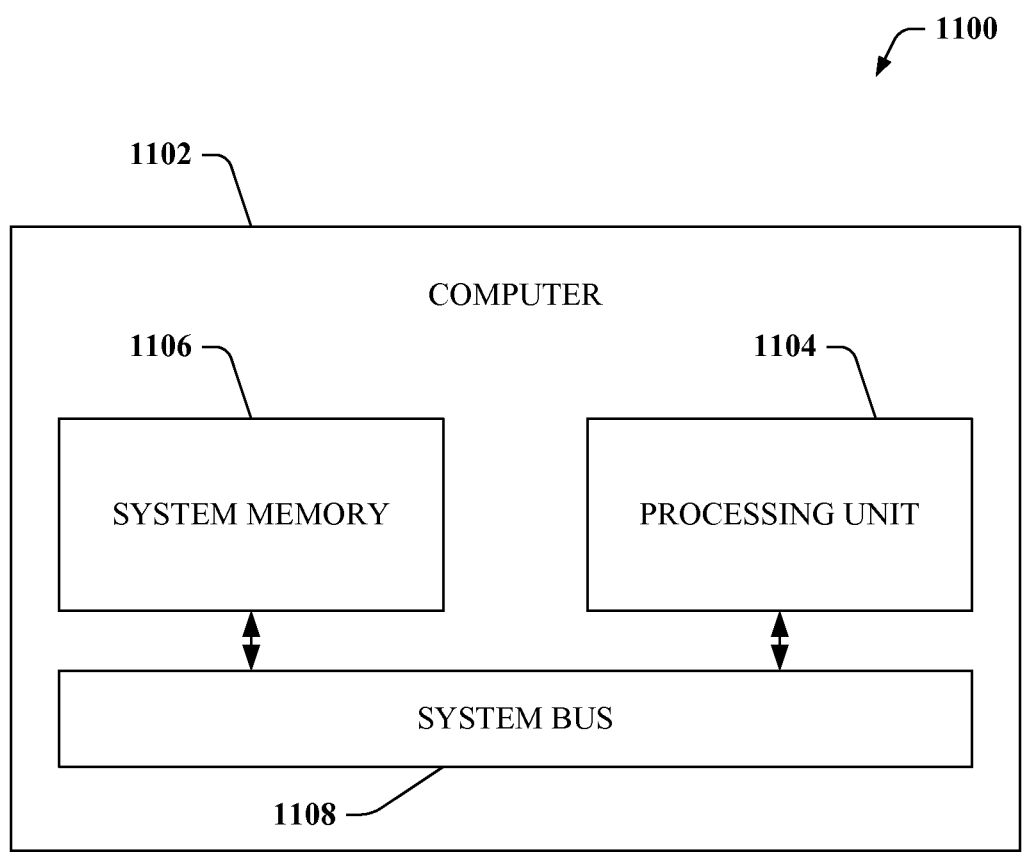
FIG. 11 depicts an example computing environment applicable to detecting, updating and/or transferring network information in accord with aspects of the claimed subject matter.

Referring now to FIG. 11, there is illustrated a block diagram of a computer operable to provide networking and communication capabilities between a wired or wireless communication network and a server and/or communication device. While shown through use of a computer or computing components, it is understood that the claimed subject matter can be implemented as a method, apparatus, or article of manufacture using standard programming and/or engineering techniques to produce software, firmware, hardware, or combinations thereof to control a computing device, such as a mobile handset, to implement the disclosed subject matter. The term "article of manufacture" as used herein is intended to encompass a computer program accessible from any suitable computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, SIM cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

In order to provide additional context for various aspects of the claimed subject matter, FIG. 11 and the following discussion are intended to provide a brief, general description of a suitable computing environment 1100 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors, such a single core processor, a multi-core processor, or any other suitable arrangement of processors. The system bus 1108 can be any of several types of bus structure that can further interconnect to a memory bus (with or without a memory controller), a peripheral bus, and a local bus using any of a variety of commercially available bus architectures. The system memory 1106 can include read-only memory (ROM), random access memory (RAM), high-speed RAM (such as static RAM), EPROM, EEPROM, and/or the like. Additionally or alternatively, the computer 1102 can include a hard disk drive, upon which program instructions, data, and the like can be retained. Moreover, removable data storage can be associated with the computer 1102. Hard disk drives, removable media, etc. can be communicatively coupled to the processing unit 1104 by way of the system bus 1108.

The system memory 1106 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1102 through one or more wired/wireless input devices, such as a keyboard, pointing and clicking mechanism, pressure sensitive screen, microphone, joystick, stylus pen, etc. A monitor or other type of interface can also be connected to the system bus 1108.

The computer 1102 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1102 can connect to other devices/networks by way of antenna, port, network interface adaptor, wireless access point, modem, and/or the like.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
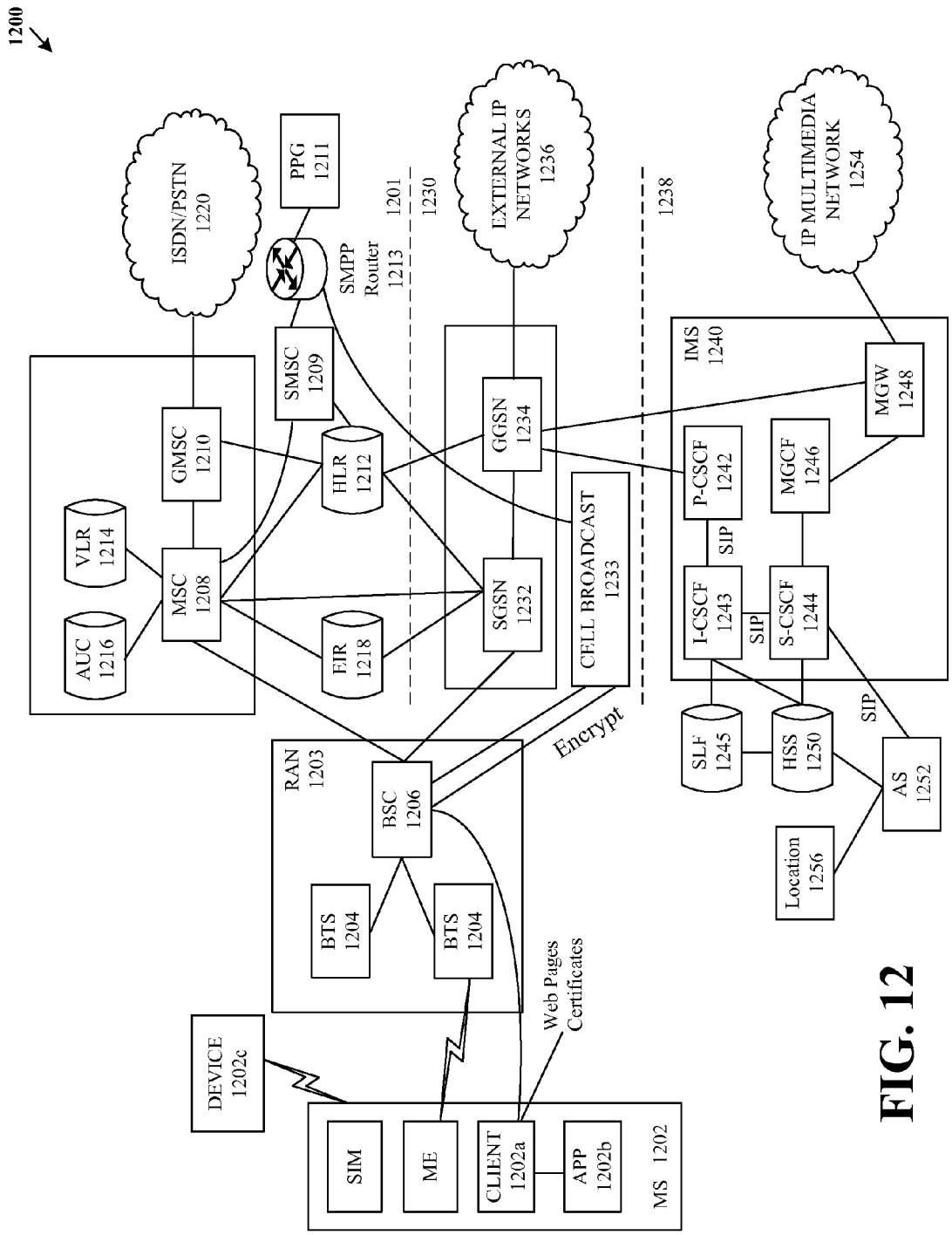
FIG. 12 illustrates a sample networking environment that can effectuate mobile communication and can facilitate data transfer applications in accord with various aspects of the subject disclosure.

Now turning to FIG. 12, such figure depicts a GSM/GPRS/IP multimedia network architecture 1200 that includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1202 includes an embedded client 1202a that receives and processes messages received by the MS 1202. The embedded client 1202a can be implemented in JAVA and is discuss more fully below.

The embedded client 1202*a* communicates with an application 1202*b* that provides services and/or information to an end user. One example of the application can be navigation software that provides near real-time traffic information that is received via the embedded client 1202*a* to the end user. The navigation software can provide road conditions, suggest alternate routes, etc. based on the location of the MS 1202. Those of ordinary skill in the art understand that there are many different methods and systems of locating an MS 1202.

Alternatively, the MS 1202 and a device 1202*c* can be enabled to communicate via a short-range wireless communication link, such as BLUETOOTH. For example, a BLUETOOTH SIM Access Profile can be provided in an automobile (e.g., device 1202*c*) that communicates with the SIM in the MS 1202 to enable the automobile's communications system to pull information from the MS 1202. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1202*c*. There can be an endless number of devices 1202*c* that use the SIM within the MS 1202 to provide services, information, data, audio, video, etc. to end users.

The BTS 1204 is physical equipment, such as a radio tower, that enables a radio interface to communicate with the MS. Each BTS can serve more than one MS. The BSC 1206 manages radio resources, including the BTS. The BSC can be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1218, and an Equipment Identity Register (EIR) 1216. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database or component(s) that comprises administrative information regarding each subscriber registered in a corresponding GSM network. The HLR 1212 also includes the current location of each MS. The VLR 1214 is a database or component(s) that contains selected administrative information from the HLR 1212. The VLR contains information necessary for call control and provision of subscribed services for each MS currently located in a geographical area controlled by the VLR. The HLR 1212 and the VLR 1214, together with the MSC 1208, provide the call routing and roaming capabilities of GSM. The AuC 1216 provides the parameters needed for authentication and encryption functions. Such parameters allow verification of a subscriber's identity. The EIR 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1211 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1202 sends a location update including its current location information to the MSC/VLR, via the BTS 1204 and the BSC 1206. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN controls the connection between the GPRS network and the MS 1202. The SGSN also keeps track of individual MS's locations and security functions and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. That is, the GGSN provides interworking functionality with external networks, and sets up a logical link to the MS through the SGSN. When packet-switched data leaves the GPRS network, it is transferred to an external TCP-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1230 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 can be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to an SIP server in a home network (and vice versa) of the MS. The P-CSCF 1242 can also modify an outgoing request according to a set of rules defined by the network operator (for example, address analysis and potential modification).

The I-CSCF 1243 forms an entrance to a home network and hides the inner topology of the home network from other networks and provides flexibility for selecting an S-CSCF. The I-CSCF 1243 can contact a subscriber location function (SLF) 1245 to determine which HSS 1250 to use for the particular subscriber, if multiple HSSs 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202.

The HSS 1250 contains a subscriber profile and keeps track of which core network node is currently handling the subscriber. It also supports subscriber authentication and authorization functions (AAA). In networks with more than one HSS 1250, a subscriber location function provides information on the HSS 1250 that contains the profile of a given subscriber.

The MGCF 1246 provides interworking functionality between SIP session control signaling from the IMS 1240 and ISUP/BICC call control signaling from the external GSTN networks (not shown). It also controls the media gateway (MGW) 1248 that provides user-plane interworking functionality (e.g., converting between AMR- and PCM-coded voice). The MGW 1248 also communicates with other IP multimedia networks 1254.

Appendix A discloses various aspects of the claimed subject matter and is hereby incorporated into the subject specification. Consequently, terms defined in the subject specification apply with equal force to substantially similar terms included within Appendix A.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory that stores executable instructions; and
a processor, coupled to the memory, that facilitates execution of the executable instructions to perform operations, comprising:
determining bandwidth information corresponding to a radio bearer device employed for a communication session between a network device of a communication network and a mobile device, wherein the bandwidth information comprises architecture type information representing an architecture type associated with the radio bearer device; and
sending the bandwidth information to a content provider device, wherein the bandwidth information enables the content provider device to determine a transmission bandwidth supported by the architecture type associated with the radio bearer device and customize content for a service to be supplied to the mobile device at a data exchange rate that is a function of the transmission bandwidth supported by the radio bearer device.

2. The system of claim 1, wherein the bandwidth information further comprises an Internet Protocol address of the radio bearer device, and the operations further comprise providing, to the content provider device, a list of Internet Protocol addresses associated with radio bearer devices of a home network of the mobile device.

3. The system of claim 1, wherein the bandwidth information further comprises radio access technology information that indicates a network architecture type related to the radio bearer device.

4. The system of claim 1, wherein the bandwidth information further comprises a server general packet radio system node Internet protocol address related to the radio bearer device.

5. The system of claim 1, wherein the operations further comprise mapping the bandwidth information to a portion of a data packet received from the mobile device and submitting the bandwidth information to the content provider device by routing the data packet, with the bandwidth information as mapped to the portion, to the content provider device.

6. The system of claim 1, wherein the operations further comprise directing a transmission of the bandwidth information to a plurality of content provider devices, other than the content provider device, that exchange data with the communication network.

7. The system of claim 1, wherein the operations further comprise storing the bandwidth information and enabling access to the bandwidth information to the content provider device.

8. A method, comprising:
receiving, by a device including a processor, bandwidth information related to a radio bearer device enabling a communication session for a mobile device, wherein the bandwidth information further comprises an architecture type associated with the radio bearer device; and
sending, by the device, the bandwidth information to a content provider device, wherein the bandwidth information enables the content provider device to determine a transmission bandwidth supported by the architecture type associated with the radio bearer device and customize content based on to supply a service to the mobile device at a data exchange rate that is based on the transmission bandwidth supported by the radio bearer device.

9. The method of claim 8, wherein the bandwidth information further comprises an Internet Protocol address of the radio bearer device, and further comprising:
providing, by the device to the content provider device, a list of Internet Protocol addresses associated with radio bearer devices of a home network of the mobile device.

10. The method of claim 8, wherein the bandwidth information further comprises radio access technology information that indicates a network architecture type related to the radio bearer device.

11. The method of claim 8, wherein the bandwidth information comprises a server general packet radio system node Internet protocol address related to the radio bearer device.

12. The method of claim 8, further comprising mapping, by the device, the bandwidth information to a portion of a data packet received from the mobile device and submitting, by the device, the bandwidth information to the content provider device by routing the data packet, with the bandwidth information mapped to the portion, to the content provider device.

13. The method of claim 8, further comprising directing, by the device, the bandwidth information to another content provider device that exchanges data with the communication network.

14. The method of claim 8, further comprising storing, by the device, the bandwidth information and making the bandwidth information available to the content provider device.

15. A computer-readable storage device having instructions stored thereon that, in response to execution, cause a device including a processor to perform operations comprising:
determining bandwidth information related to a radio bearer device providing a communication session to a mobile device, wherein the bandwidth information comprises an architecture type associated with the radio bearer device; and
sending the bandwidth information to a content provider device, wherein the bandwidth information enables the content provider device to infer a transmission bandwidth supported by the architecture type associated with the radio bearer device and customize content for a service to be provided to the mobile device at a data exchange rate that substantially matches the transmission bandwidth supported by the radio bearer device.

16. The computer-readable storage device of claim 15, wherein the bandwidth information comprises an Internet Protocol address of the radio bearer device, and the operations further comprise providing, to the content provider device, a list of Internet Protocol addresses associated with radio bearer devices of a home network of the mobile device.

17. The computer-readable storage device of claim 15, wherein the bandwidth information further comprises a radio access technology information element that indicates a network architecture type related to the radio bearer device.

18. The computer-readable storage device of claim 15, wherein the bandwidth information further comprises a server general packet radio system node Internet protocol address related to the radio bearer device.

19. The computer-readable storage device of claim 15, wherein the operations further comprise mapping the bandwidth information to a portion of a data packet received from the mobile device and submitting the bandwidth information to the content provider device by routing the data packet, with the bandwidth information mapped to the portion, to the content provider device.

20. The computer-readable storage device of claim 15, wherein the operations further comprise transmitting the bandwidth information to a plurality of other content provider devices that exchange data with the communication network.

* * * * *